July 8, 1969    D. DROPKIN ET AL    3,453,880
HIGH TEMPERATURE PROBE
Filed Feb. 28, 1966
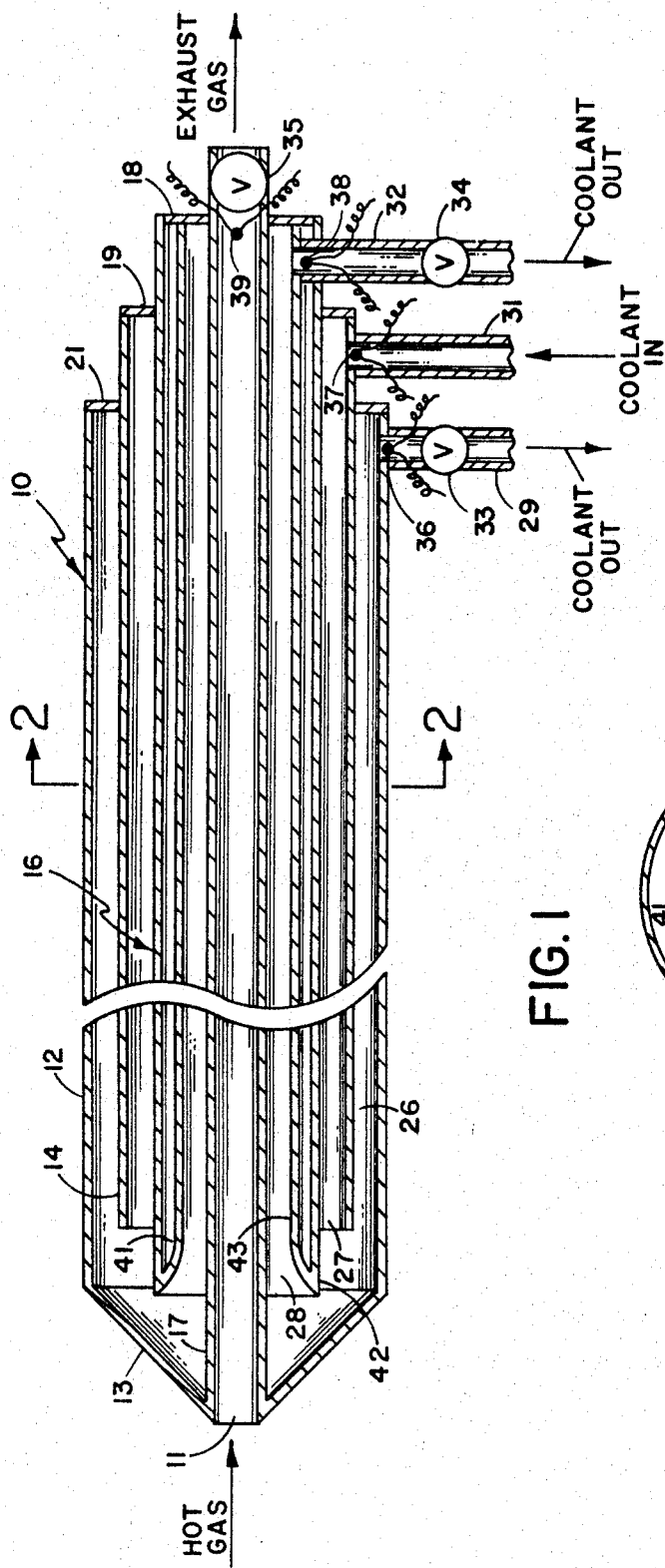
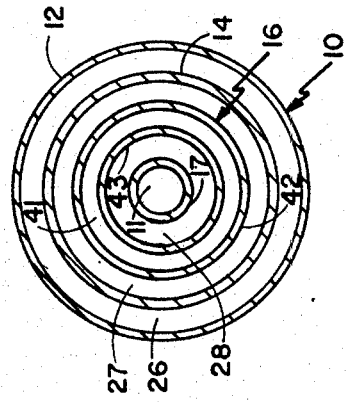
DAVID DROPKIN
THOMAS J. O'CONNOR
EDWARD H. COMFORT
LEE A. CASS
INVENTOR.
BY Alden D. Redfield
Aubrey C. Brine
ATTORNEYS

United States Patent Office 3,453,880
Patented July 8, 1969

3,453,880
HIGH TEMPERATURE PROBE
David Dropkin, Ithaca, N.Y., and Thomas J. O'Connor, Chelmsford, Lee A. Cass, Boxford, and Edward H. Comfort, Woburn, Mass., assignors to Avco Corporation, Cincinnati, Ohio, a corporation of Delaware
Filed Feb. 28, 1966, Ser. No. 530,701
Int. Cl. G01k 17/06
U.S. Cl. 73—190                                 8 Claims

ABSTRACT OF THE DISCLOSURE

A high temperature probe for determining the enthalpy and other properties of high temperature fliud streams is described. The probe contains concentric passages surrounding a central passage through which the sample fluid is passed. The encircling passages are arranged so that a coolant liquid is split into two portions, one of which neutralizes the effects of the environment while the other is used to absorb heat from the sample fluid.

---

This invention relates to high temperature probes and more particularly to a probe device for determining the enthalpy and other properties of heated supersonic or subsonic fluid streams.

Heretofore, many devices have been suggested for measuring the properties of heated supersonic or subsonic gas streams. These devices have generally taken many forms, including the use of probes employing a fluid stream for cooling the gas sample. In many instances these probe devices have proved inadequate for their intended use, and generally they have not filled the long felt need for a simple precision device of this type.

One type of device which is in general use provides for a double-walled probe wherein a flow of fluid is passed over the outer jacket for cooling purposes, and then over the inner wall of the probe to absorb heat from the gas flowing through the probe. This type of probe, using a single fluid flow, requires a "tare" determination to be taken when gas is not flowing through the probe, for comparison with heat absorption coolant when gas is flowing through the probe.

The equation for determining the stagnation enthalpy for this type of probe then includes as a term the difference between the coolant temperature rise during the tare measurement and the coolant temperature during gas flow conditions. It has been found in such known devices that the temperature rise during tare measurement is generally 75 to 95% of the temperature rise experienced while sampling the gas stream. The difference between the two temperature changes which are of nearly equal magnitude therefore, may provide an objectionable degree of error in the final enthalpy calculation.

In addition, this situation is worsened when the device is employed in a turbulent stream, characterized by large fluctuation of velocity and gas enthalpy. Such conditions provide correspondingly large perturbations in the measured temperature changes of the probe coolant.

The invention therefore, has as an object to provide a fluid cooled enthalpy probe wherein the measurements of temperature rise are obtained more accurately.

Another object of the invention is to provide an enthalpy probe which is more precise in operation than probes of the prior art.

A further object of the invention is to provide an enthalpy probe which is simple in construction and therefore may be easily and inexpensively fabricated.

The objects of the invention, and other objects which will become apparent as the description proceeds, are achieved by providing an enthalpy probe having four concentric passages; three of which allow for the passage of fluid necessary for cooling the device and for measurement of the gas enthalpy, and one passage located on the probe axis to allow gas samples to flow through the probe.

Coolant enters the probe through the second passage located from the outer casing and flows toward the tip of the probe. At the nose of the probe this fluid stream splits into two parts. The major portion of the coolant passes through the outermost passage thus providing for protection of the device from the external environment. A small part of the total coolant passes through the innermost coolant passage and is used in cooling the gas flowing through the sampling tube located on the probe axis.

The enthalpy of the gas sample is determined by an energy balance on that portion of the coolant which is used to cool the gas sample, and on the gas sample itself. However, since this coolant flow does provide some cooling to the conical tip of the probe, two measurements of the temperature rise experienced by the coolant, a tare measurement and a gas flow measurement are taken to obtain the enthalpy of the gas. In addition, single measurements of coolant and gas flow rates, and the temperature of the gas stream as it leaves the probe are obtained and employed in the energy balance equation.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is an elevational, sectional view partially in schematic showing an enthalpy probe constructed in accordance with the present invention, and FIGURE 2 is a sectional view taken on the lines 2—2 of FIGURE 1 showing a portion of the invention in detail.

Referring now to the drawings, especially FIGURE 1 there is shown a probe device 10 providing means defining a plurality of passages therein, and having a centrally disposed passage 11 extending therethrough.

The probe 10 is generally comprised of an outer cylindrical wall 12 which is attached to a conical front, or tip portion 13 partially forming the probe casing. Within the enclosure defined by the cylindrical casing there are a plurality of concentrically disposed tubular members 14 and 16, and an inner tubular wall 17 serves to complete the enclosure and define the passage 11 for flow of hot gas through the probe.

The tubular members 14 and 16 and the walls 12 and 17 of the casing are interconnected at the rear of the probe 10 by walls 18, 19 and 21 which are in the form of disc-shaped members. The walls 18, 19 and 21 sealably engage the tubular members at the rear of the probe 10, and serve to define the rear limits of the enclosure. The tubular wall 17 extends the entire length of the probe 10 and is sealably engaged to the conical portion 13 at the forward end.

Referring now to FIGURES 1 and 2, it will be noted that the tubular wall 12 and tubular member 14 define a passage 26, tubular members 14 and 16 define a second passage 27, and tubular member 16 and inner tubular wall 17 define yet another passage 28. Each of these passages 26, 27 and 28 are connected to inlet and outlet lines 29, 31 and 32 respectively which open into the respective passages to provide means for entry and exhaust of fluid with respect to the enclosure. The tubular members 14 and 16 thereby provide means for directing the flow of fluid forwardly through the passage 27 and separating the flow adjacent the tip 13 into a rearwardly directed flow through the passage 26 to the passage 28.

Both the lines 29 and 32 are provided with a means for adjusting flow into or out of the respective passages in the form of adjustable valves 33 and 34, respectively. Another valve 35 is positioned adjacent the outlet end of the passage 11 and serves as a means to close the passage against flow of gas therethrough.

As will also be noted from FIGURE 1, the probe 10 is provided with a plurality of temperature sensing means in the form of thermocouples 36, 37 and 38 disposed in the lines 29, 31 and 32, respectively adjacent the opening of the line into the passages, for measuring the temperatures of flowing fluid. In addition, a fourth thermocouple 39 is disposed in the centrally disposed passage 11 adjacent the aft end thereof, and serves as a means for measuring the temperature of the hot gas flow leaving the passage.

The reader's attention is directed back to drawings FIGURES 1 and 2 taken together, where it is shown that the tubular member 16 is provided with insulating means in the form of a chamber 41 defined by concentric walls 42 and 43 disposed in spaced relation. A vacuum is drawn in the chamber 41 prior to sealing of the walls 42 and 43 and is maintained for insulating purposes.

While the insulating means employed by the tubular member 16 is shown as a vacuum chamber 41, such other insulating means as ceramics or other high temperature material could be used. However, as it is often necessary to bend the probe 10 to conform to a required configuration, the vacuum insulating means has proven to meet this requirement without cracking or in any way being injured by the bending process.

Operation

By way of example and not of limitation, the probe 10 will be described in operation to perform a simple enthalpy measurement.

In measuring the total gas enthalpy in a heated supersonic or subsonic gas stream the probe 10 provides the information necessary for use in the following equation where the total gas enthalpy is determined from an energy balance.

$$H_g = \frac{m_{H_2O} C_{P_{H_2O}} (\Delta T_2 - \Delta T_1)}{m_g} + C_{p_g}(T_g - T_o)$$

where:

$C_{p_g}$=Gas specific heat, B.t.u./lb.
$C_{p_g}$=Gas specific heat, B.t.u./lb.
$H_g$=Total gas enthalpy, B.t.u./lb.
$m_g$=Gas flow rate through the probe, lb./sec.
$m_{H_2O}$=Gas sample coolant flow rate (through passage 28) lb./sec.
$\Delta T_2$=Coolant temperature rise with gas sample flowing through probe, ° F.
$\Delta T_1$=Coolant temperature rise without gas flow through the probe, ° F.
$T_g$=Gas sample temperature at probe exit, ° F.
$T_o$=Base temperature for computation of gas enthalpy, ° F.

In operation, the probe 10 is readied for service by attaching a supply of water, or other coolant, to the line 31 and adjusting the valves 33 and 34 to give a desired flow from the exit lines 29 and 32, respectively.

As will be noted, the coolant flows from the line 31 into the passage 27 forward to a point adjacent the conical portion 13 of the probe 10. At a point adjacent the conical portion 13, the flow of coolant splits and a first portion flows rearwardly through the passage 26 and a second portion flows rearwardly through the passage 28. The relative quantities of the portion of flow, which is directed to either passage 26 or 28 is directly dependent on the adjustment of valves 33 and 34, which is evident from FIGURE 1.

The incorporation of suitable valving means on the two exhaust lines 29 and 32 makes it possible to adjust the coolant flow in passages 26 and 28 over a wide range and thus obtain any desired magnitude of coolant temperature rise.

From the equation for $H_g$ it is evident that in practice it is desirable to adjust the flow rates so that the coolant temperature rise in passage 26 as measured by thermocouple 36 is small, and both the coolant flow rate and temperature rises in passage 28 are large in order to minimize the error in the product $m_{H_2O} C_p (\Delta T_2 - \Delta T_1)$.

Due to the large temperature rise experienced by the coolant flow through passage 28, it has been found desirable to provide insulating means between the gas sample coolant flow in passage 28 and the coolant flow through passage 27, to minimize heat loss across the member 16. These losses become almost non-existent when an evacuated chamber 41, as incorporated in tubular member 16, is disposed between the high and low temperature coolant flow.

To return to the measuring process itself, the probe 10 is now induced into the heated gas stream, at which time the steady state temperature of the main coolant stream entering passage 27 is measured by a thermocouple 37 and the steady state temperature of gas sample coolant in passage 28 is measured as it leaves the probe 10 by the thermocouple 38. The change in temperature experienced by the gas coolant gives the value for $\Delta T_1$.

In addition, the gas sample coolant flow rate $m_{H_2O}$ entering the line 31 is measured, and kept at a constant rate during the entire enthalpy measuring process. This flow rate may be measured by a flow meter or any suitable means which is well known in the art.

If it is also desirable, with the valve 35 closed, a pressure transducer may be provided in the passage 11 such that a determination of stagnation pressure or impact pressure can be made at this time.

With the above values thus determined, the valve 35 is opened and the hot gas sample flows through the passage 11 and exits at the rear of the probe 10. The valve 35 remains open until the coolant flowing through the line 32 remains at a steady state temperature as determined by the thermocouple 38.

At this time the steady state probe inlet coolant temperature is measured by the thermocouple 37 as it enters from the line 31. The steady state temperature of the gas coolant is measured by the thermocouple 38 as it exits through the line 32, and the coolant flow rate in the line 32 is measured by a flow measuring device (not shown) which may be a flowmeter of any type well known in the art.

The temperature differential between the measurement at thermocouple 37 and the measurement at thermocouple 38 provides a value for $\Delta T_2$.

In addition to the above measurement, the gas flow rate through the passage 11 of the probe 10 is measured by any suitable means which may be disposed down stream of the valve 35. This measurement gives a value for $m_g$. The gas sample temperature adjacent the exit of the probe 10 is measured by a thermocouple 39 and provides a value for $T_g$.

The remaining terms $C_{pg}$ and $T_o$ are then inserted in the equation using values for the specific gas employed and for the enthalpy base desired.

With the measurements thus taken, and employing the equation as set forth, the total gas enthalpy may be found.

As will be evident to those familiar with the art, with knowledge of the local stagnation enthalpy and static pressures, as well as the composition of the gas sample taken during the enthalpy determination, it is now possible to obtain local stream variables, i.e., density, Mach number, composition and velocity, when some degree of equilibrium is assumed for the stream.

From the foregoing description of operation, it should be evident that the probe 10 provides a simple device for measuring properties of a high temperature gas with greater accuracy and precision than obtained with prior art devices. By incorporating valves 33 and 34 it is possible to adjust the coolant flow through the passages 26 and 28 and thus obtain any desired magnitude of coolant temperature rise. As it is desirable to adjust the water flow rate such that coolant flow through the passage 26 obtains a very small temperature rise, it should be evident that this aim may be accomplished with repeated success in the probe 10.

The split coolant flow embodied in the probe 10 also reduces the temperature of the tare measurement to a small portion of the final temperature rise, since the adjusted coolant stream in the passage 28 is required to cool only a small portion of the conical portion 13 of the probe tip.

Additionally, the large increase in sensitivity described above is accomplished with improved accuracy, since heat loss from the warm inner gas flow coolant to the incoming coolant stream (and thereby to the outer probe coolant stream) is virtually eliminated by the vacuum chamber 41 separating the passages 27 and 28.

Thus, the split flow of coolant and the insulating means between the passages 27 and 28 both combine to achieve the objects of the invention as set forth.

It should also be evident that the magnitude of the tare measurement described above can be reduced by minimizing heat transfer between the streams in passages 26 and 27. This end can be accomplished by replacing the tubular member 14 with a double walled insulated member which is identical in concept to that between passages 27 and 28 as shown in FIGURE 1.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

1. In a probe for measuring properties of a high temperature gas the combination comprising:
   a cylindrical casing having an inner tubular wall and an outer tubular wall defining an enclosure therebetween,
   inlet means in said casing for flow of coolant fluid into said enclosure,
   means disposed in said enclosure for directing the fluid flow forwardly toward one end of said casing and separating said flow into a rearwardly directed flow of fluid contiguous to said outer tubular wall and a rearwardly directed flow of said fluid contiguous to said inner tubular wall,
   means in said enclosure for insulating a forwardly directed flow of fluid from a rearwardly directed flow of fluid, and
   outlet means in said casing for exhaust of coolant flow from said enclosure.

2. The structure of claim 1 wherein said means for directing fluid flow comprises a plurality of tubular members each surrounding said inner tubular wall, said members having their rearward ends sealably engaged adjacent a rearward end of said casing and their forward ends in spaced relation to the forward end of said casing thereby defining a plurality of flow passages separated one from another over substantially the total length of said casing and opening one into another at the forward end of said casing.

3. The structure of claim 2 wherein said means for insulating a forwardly directed flow of fluid from a rearwardly directed flow of fluid comprises at least one of said tubular members having a pair of walls disposed in spaced relation and sealed at both ends to provide a closed chamber therebetween, said chamber being maintained at a pressure substantially less than atmospheric pressure to thereby prevent heat transfer through said one tubular member.

4. The structure of claim 2 which is further characterized by said plurality of tubular members comprising a first tubular member in spaced relation with said inner tubular wall defining a first passage for rearwardly directed flow of fluid, therebetween,
   a second tubular member in spaced relation with said outer tubular wall, defining a second passage for rearwardly directed flow of fluid therebetween, and
   said first tubular member and said second tubular member being spaced one from the other for providing a passage for forwardly directed flow of fluid therebetween.

5. The structure of claim 4 wherein said means for insulating a forwardly directed flow of fluid from a rearwardly directed flow of fluid comprises said first tubular member having a pair of walls disposed in spaced relation and sealed at both ends to provide a closed chamber therebetween, and said chamber being maintained at a pressure substantially less than atmospheric pressure to thereby prevent heat transfer through said first tubular member.

6. The structure as defined in claim 5 wherein said outlet means comprises one exhaust line interconnecting with said first passageway and a separate exhaust line interconnecting with said second passageway, and each of said exhaust lines being provided with a separate means for adjusting flow of fluid therethrough.

7. The structure of claim 6 which is further characterized by means disposed in each of said exhaust lines for measuring the temperature of fluid flow therethrough.

8. A probe for measuring properties of a high temperature gas comprising:
   a cylindrical casing having an inner tubular wall and an outer tubular wall defining an enclosure therebetween, said inner tubular wall defining a central passage through the cylinder,
   said inner wall and said outer wall being interconnected at their forward end by a conical portion defining a tip,
   an inlet line opening into said casing for flow of coolant fluid into said enclosure,
   a pair of lines connected to said casing for exhaust of fluid flow from said enclosure,
   a first tubular member and a second tubular member having their rearward ends sealably engaged adjacent a rearward end of said casing and their forward ends in spaced relation with said conical portion,
   said first tubular member being disposed in spaced relation with said inner tubular wall defining a first passage for rearwardly directed flow of fluid therebetween, and said second tubular member being disposed in spaced relation with said outer tubular wall defining a second passage for rearwardly directed flow of fluid therebetween,
   said first tubular member and said second tubular member further being spaced one from another for providing a passage for forwardly directed flow of fluid therebetween,
   said first tubular member comprising a pair of walls disposed in spaced relation and sealed at both ends to provide a closed chamber therebetween,
   said chamber being maintained at a pressure substantially less than atmospheric pressure to prevent heat transfer through said first tubular member, said exhaust lines being interconnected with said first passage for rearwardly directed flow of fluid and the other of said exhaust lines being interconnected with said second passage for rearwardly directed fluid, means in said one exhaust line for adjusting flow of fluid therethrough and separate means in said other exhaust line for adjusting flow of fluid therethrough, temperature measuring means in each of said exhaust lines and in said inlet line for measuring the temperature of fluid flow into said casing and the temperature of each of the fluid flows leaving said casing, and temperature measuring means in the central passage for measuring the temperature of gas as it flows through the probe.

References Cited

UNITED STATES PATENTS

| | | | |
|---|---|---|---|
| 3,167,956 | 2/1965 | Grey | 73—190 |
| 3,301,059 | 1/1967 | Haas | 73—339 |

RICHARD C. QUEISSER, *Primary Examiner.*

EDWARD D. GILHOOLY, *Assistant Examiner.*

U.S. Cl. X.R.

73—339